US012790016B2

(12) United States Patent
Weaver et al.

(10) Patent No.: US 12,790,016 B2
(45) Date of Patent: Nov. 10, 2026

(54) HYBRID AIRCRAFT PROPULSION SYSTEM WITH REMOTELY LOCATED ELECTRIC MACHINE

(71) Applicant: Pratt & Whitney Canada Corp., Longueuil (CA)

(72) Inventors: Paul Weaver, Chateauguay (CA); Bruno Chatelois, Boucherville (CA)

(73) Assignee: Pratt & Whitney Canada Corp., Longueuil (CA)

(*) Notice: Subject to any disclaimer, the term of this patent is extended or adjusted under 35 U.S.C. 154(b) by 79 days.

(21) Appl. No.: 18/088,221

(22) Filed: Dec. 23, 2022

(65) Prior Publication Data

US 2024/0208663 A1 Jun. 27, 2024

(51) Int. Cl.
*B64D 35/025* (2025.01)
*B64D 27/12* (2006.01)
*B64D 27/31* (2024.01)
*F02K 5/00* (2006.01)
*H02K 7/116* (2006.01)

(52) U.S. Cl.
CPC ........... *B64D 35/025* (2024.01); *B64D 27/12* (2013.01); *B64D 27/31* (2024.01); *F02K 5/00* (2013.01); *H02K 7/116* (2013.01)

(58) Field of Classification Search
CPC ...... B64D 35/025; B64D 27/31; B64D 27/33; B64D 33/04; B64D 33/06
See application file for complete search history.

(56) References Cited

U.S. PATENT DOCUMENTS 2,462,201 A 2/1949 Kilgore
4,476,395 A * 10/1984 Cronin ................ H02K 7/1807 310/59
4,955,561 A 9/1990 Seefluth
(Continued)

FOREIGN PATENT DOCUMENTS

DE 509143 C 10/1930
DE 3629867 A1 * 3/1988
(Continued)

OTHER PUBLICATIONS

Translation of DE 3629867 (Year: 1988).*
EP Search Report for EP Patent Application No. 23219889.5 dated Apr. 30, 2024.

*Primary Examiner* — Joshua J Michener
*Assistant Examiner* — Ryan Andrew Yankey
(74) *Attorney, Agent, or Firm* — Getz Balich LLC

(57) ABSTRACT

An aircraft system is provided that includes a propulsor rotor, a geartrain, a thermal engine, a drivetrain and an electric machine. The geartrain includes a power output, a first power input and a second power input. The power output is coupled to the propulsor rotor. The thermal engine is configured to drive rotation of the propulsor rotor through the geartrain. The thermal engine is coupled to the first power input. The drivetrain includes a first driveshaft and a second driveshaft. The first driveshaft is coupled to and between the second power input and the second driveshaft. The second driveshaft is angularly offset from the first driveshaft. The electric machine is configured to drive rotation of the propulsor rotor through the drivetrain and the geartrain. The second driveshaft is coupled to and between the first driveshaft and the electric machine.

20 Claims, 4 Drawing Sheets

(56) References Cited

U.S. PATENT DOCUMENTS

| | | | | | |
|---|---|---|---|---|---|
| 5,687,561 | A * | 11/1997 | Newton | F02C 7/32 | |
| | | | | 60/226.1 | |
| 5,694,765 | A * | 12/1997 | Hield | F02C 3/113 | |
| | | | | 60/39.163 | |
| 7,552,582 | B2 | 6/2009 | Eick | | |
| 8,324,746 | B2 | 12/2012 | Bradbrook | | |
| 9,022,318 | B2 * | 5/2015 | Laude | B64D 27/18 | |
| | | | | 244/99.6 | |
| 11,168,617 | B2 * | 11/2021 | Kupratis | F02K 3/06 | |
| 12,595,746 | B2 * | 4/2026 | Chatelois | B64D 27/33 | |
| 2009/0139243 | A1 * | 6/2009 | Winter | F02K 3/06 | |
| | | | | 60/797 | |
| 2014/0096501 | A1 * | 4/2014 | Pantalone, III | B64C 27/04 | |
| | | | | 60/39.5 | |
| 2018/0044028 | A1 | 2/2018 | Takami | | |
| 2018/0141670 | A1 | 5/2018 | Keller | | |
| 2019/0300186 | A1 | 10/2019 | Lieven | | |
| 2020/0017211 | A1 * | 1/2020 | Hefner | B64D 27/40 | |
| 2020/0277061 | A1 | 9/2020 | Becker | | |
| 2020/0277076 | A1 | 9/2020 | Becker | | |
| 2020/0298988 | A1 * | 9/2020 | LaTulipe | B64D 35/08 | |
| 2021/0163142 | A1 * | 6/2021 | Lacko | B64D 29/00 | |
| 2022/0154651 | A1 * | 5/2022 | Bowden | B64D 27/10 | |
| 2024/0034479 | A1 * | 2/2024 | Detweiler | B60L 3/0046 | |
| 2025/0011000 | A1 * | 1/2025 | Hon | B60W 10/06 | |
| 2026/0116566 | A1 * | 4/2026 | Cantagalli | B64D 27/355 | |

FOREIGN PATENT DOCUMENTS

| | | | |
|---|---|---|---|
| FR | 3119373 | B1 | 6/2023 |
| GB | 526460 | A | 9/1940 |

* cited by examiner

HYBRID AIRCRAFT PROPULSION SYSTEM WITH REMOTELY LOCATED ELECTRIC MACHINE

TECHNICAL FIELD

This disclosure relates generally to an aircraft and, more particularly, to a hybrid propulsion system for the aircraft.

BACKGROUND INFORMATION

A hybrid propulsion system for an aircraft may include a thermal engine, such as a gas turbine engine, and an electric motor. The thermal engine and the electric motor may be coupled to and may selectively drive rotation of a propeller through a geartrain. Various types and configurations of hybrid aircraft propulsion systems are known in the art. While these known hybrid aircraft propulsion systems have various benefits, there is still room in the art for improvement.

SUMMARY

According to an aspect of the present disclosure, an aircraft system is provided that includes a propulsor rotor, a geartrain, a thermal engine, a drivetrain and an electric machine. The geartrain includes a power output, a first power input and a second power input. The power output is coupled to the propulsor rotor. The thermal engine is configured to drive rotation of the propulsor rotor through the geartrain. The thermal engine is coupled to the first power input. The drivetrain includes a first driveshaft and a second driveshaft. The first driveshaft is coupled to and between the second power input and the second driveshaft. The second driveshaft is angularly offset from the first driveshaft. The electric machine is configured to drive rotation of the propulsor rotor through the drivetrain and the geartrain. The second driveshaft is coupled to and between the first driveshaft and the electric machine.

According to another aspect of the present disclosure, another aircraft system is provided that includes a propulsor rotor, a thermal engine, an electric machine and an aircraft wing. The thermal engine is configured to drive rotation of the propulsor rotor. The electric machine is configured to drive rotation of the propulsor rotor. The thermal engine and the electric machine are independently mounted to the aircraft wing.

According to still another aspect of the present disclosure, another aircraft system is provided that includes a propulsor rotor, a thermal engine, an electric machine and an aircraft wing. The thermal engine is configured to drive rotation of the propulsor rotor. The electric machine is configured to drive rotation of the propulsor rotor. The thermal engine is disposed outside of the aircraft wing. The electric machine is at least partially housed within the aircraft wing.

The thermal engine may be disposed outside of the aircraft wing. The electric machine may be at least partially housed within the aircraft wing.

The aircraft system may also include a geartrain and a drivetrain. The geartrain may include a power output, a first power input and a second power input. The power output may be coupled to the propulsor rotor. The first power input may be coupled to the thermal engine. The drivetrain may include a first driveshaft, a second driveshaft and an angle drive coupling the first driveshaft to the second driveshaft.

The first driveshaft may be coupled to the second power input. The second driveshaft may be coupled to the electric machine.

The second driveshaft may be angularly offset from the first driveshaft by an acute angle.

The second driveshaft may be angularly offset from the first driveshaft by a right angle.

The drivetrain may also include an angle drive coupled to and between the first driveshaft and the second driveshaft.

The propulsor rotor may be rotatable about a rotational axis. The thermal engine may be located axially between the geartrain and the electric machine along the rotational axis.

The aircraft system may also include an airframe structure. The thermal engine and the electric machine may be independently mounted to the airframe structure.

The airframe structure may be configured as an aircraft wing.

The electric machine may be housed within the aircraft wing at a leading edge of the aircraft wing.

The thermal engine may be disposed outside of the airframe structure. The electric machine may be at least partially housed within the airframe structure.

The electric machine may be vertically below the airframe structure.

The electric machine may be outside of the airframe structure.

The aircraft system may also include a nacelle at least partially housing the thermal engine and the electric machine.

The thermal engine may include an exhaust duct at an aft end of the thermal engine. At least a portion of the electric machine may be disposed aft of the exhaust duct.

The electric machine may be configurable as an electric motor during a motor mode of operation to drive rotation of the propulsor rotor through the drivetrain and the geartrain. The electric machine may also be configurable as an electric generator during a generator mode of operation where the thermal engine is configured to power the electric machine through the geartrain and the drivetrain.

The thermal engine may be configured as a gas turbine engine.

The propulsor rotor may be configured as or otherwise include a propeller rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
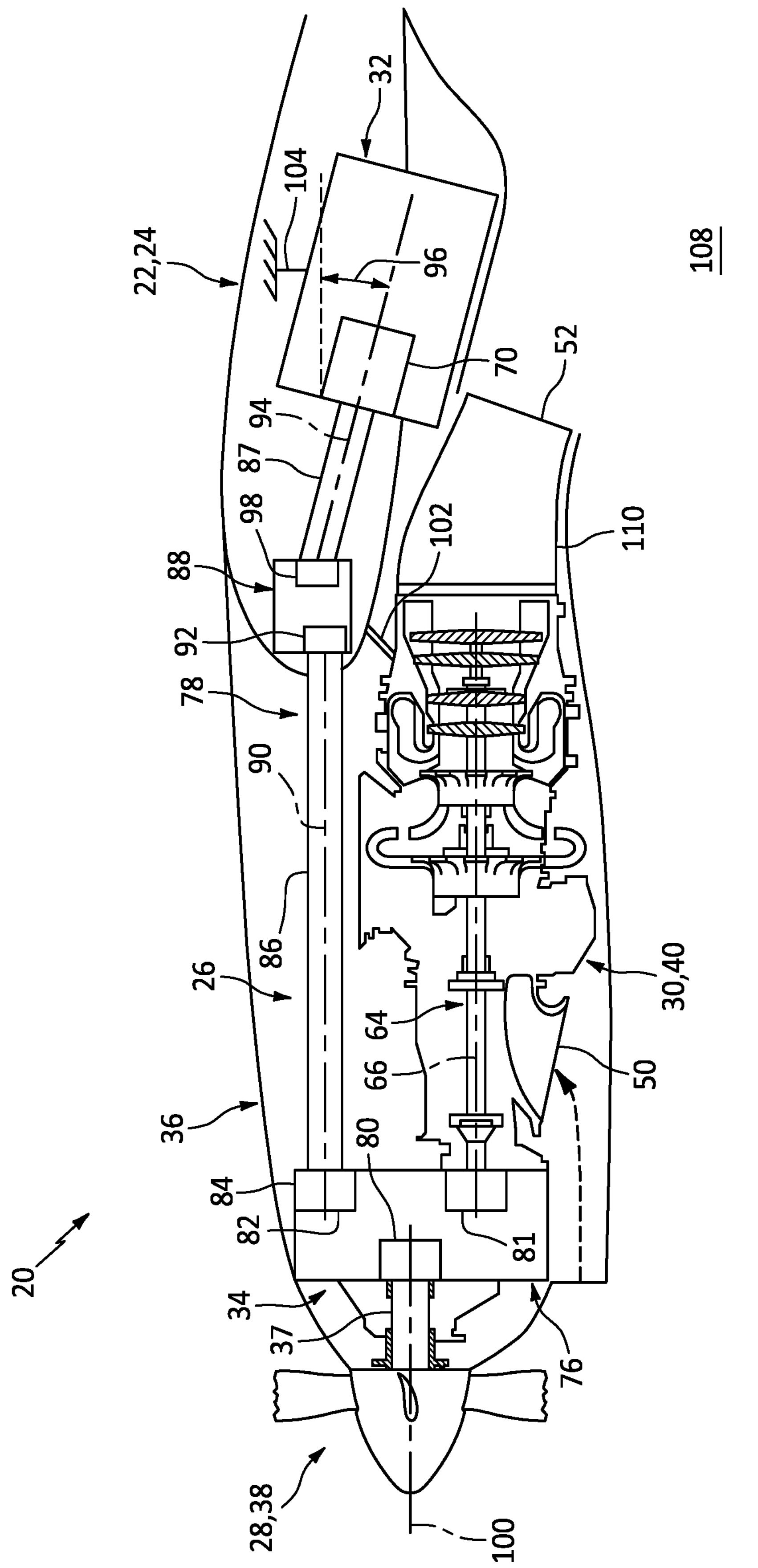
FIG. 1 is a partial sectional schematic illustration of an aircraft system with the electric machine disposed/housed partially inside an aircraft wing structure.

FIG. 1 illustrates a system 20 for an aircraft such as an airplane. This aircraft system 20 includes an airframe structure 22 such as an aircraft wing 24. The aircraft system 20 also includes a hybrid aircraft propulsion system 26 mounted to the airframe structure 22. The aircraft propulsion system 26 includes a propulsor rotor 28, a thermal engine 30 (e.g., a heat engine), an electric machine 32 and a power transmission system 34. The aircraft propulsion system 26 also includes a nacelle 36 at least partially housing and providing an aerodynamic cover for one or more components 30, 32 and/or 34 of the aircraft propulsion system 26.

The propulsor rotor 28 is a bladed rotor mechanically driven by an output shaft 37 or another torque transmission device. This propulsor rotor 28 may be an open rotor such as a propeller rotor 38 for a propeller engine; e.g., a hybrid turboprop engine. The present disclosure, however, is not limited to such an exemplary propulsor rotor. The propulsor rotor 28, for example, may alternatively be configured as a rotor (e.g., a main rotor) for a helicopter engine (e.g., a hybrid turboshaft engine), or a rotor (e.g., a fan rotor, a compressor rotor, etc.) for a turbofan engine or a turbojet engine. However, for ease of description, the propulsor rotor 28 may be described below as the propeller rotor 38.

The thermal engine 30 is configured to convert chemical energy stored within fuel into mechanical power. The thermal engine 30 of FIG. 1, for example, is configured as or may otherwise include a gas turbine engine 40. The present disclosure, however, is not limited to such an exemplary thermal engine. The thermal engine 30, for example, may alternatively be configured as or otherwise include a reciprocating piston internal combustion (IC) engine or a rotary internal combustion (IC) engine. However, for ease of description, the thermal engine 30 may be described and/or referred to as herein the gas turbine engine 40.

Figure 2:
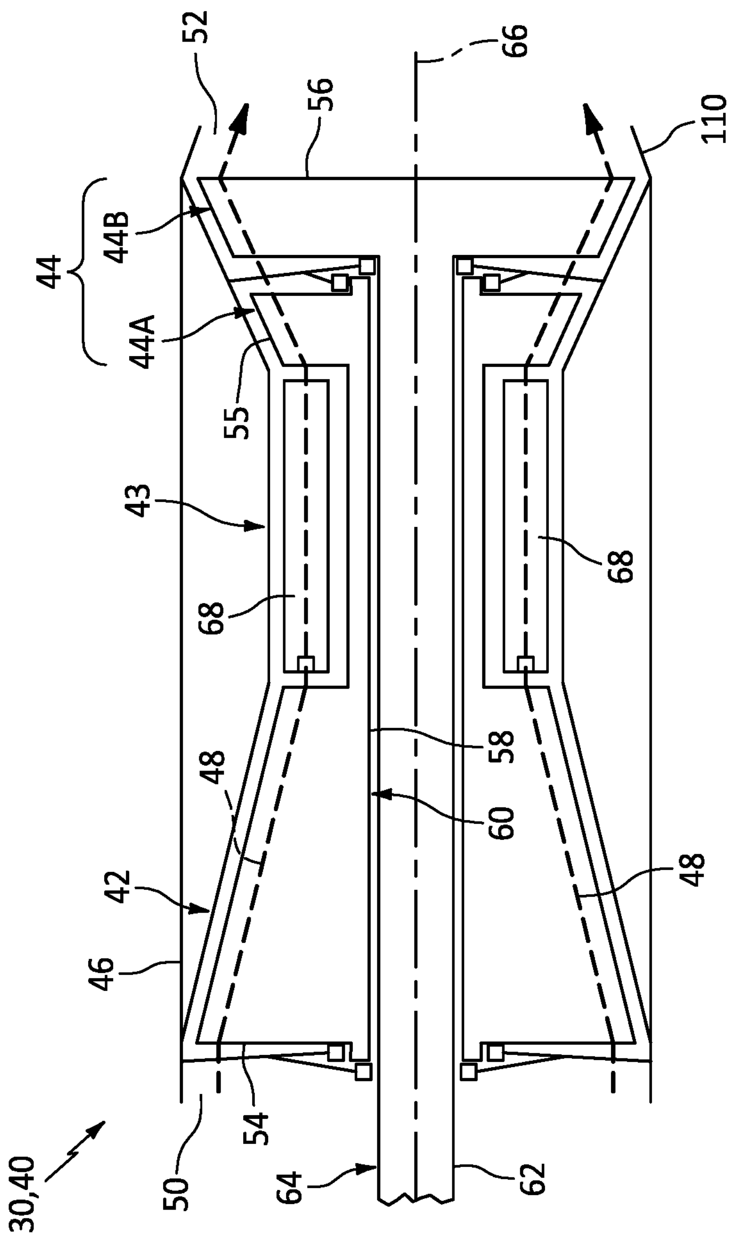
FIG. 2 is a schematic illustration of a gas turbine engine.

Referring to FIG. 2, the gas turbine engine 40 includes a compressor section 42, a combustor section 43 and a turbine section 44. The turbine section 44 may include a high pressure turbine (HPT) section 44A and a low pressure turbine (LPT) section 44B; e.g., a power turbine section. The gas turbine engine 40 also includes an engine case 46 housing the engine sections 42-44B.

The compressor section 42, the combustor section 43, the HPT section 44A and the LPT section 44B are arranged sequentially along a core flowpath 48 within the gas turbine engine 40. This core flowpath 48 extends within the gas turbine engine 40 from an upstream airflow inlet 50 into the gas turbine engine 40 to a downstream combustion products exhaust 52 from the gas turbine engine 40.

Each of the engine sections 42, 43A and 44B includes a respective bladed rotor 54-56. Each of these bladed rotors 54-56 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The compressor rotor 54 is connected to the HPT rotor 55 through a high speed shaft 58. At least the compressor rotor 54, the HPT rotor 55 and the high speed shaft 58 may collectively form a high speed rotating structure 60 of the gas turbine engine 40. The LPT rotor 56 is connected to a low speed shaft 62, which low speed shaft 62 may extend axially through a bore of the high speed rotating structure 60 and its high speed shaft 58. At least the LPT rotor 56 and the low speed shaft 62 may collectively form a low speed rotating structure 64 of the gas turbine engine 40. Each of the rotating structures 60, 64 of FIG. 2 is rotatable about an axial centerline 66 (e.g., a rotational axis) of the gas turbine engine 40.

During gas turbine engine operation, air enters the core flowpath 48 through the airflow inlet 50 and is directed into the compressor section 42. The air within the core flowpath 48 may be referred to as "core air". This core air is compressed by the compressor rotor 54 and directed into a combustion chamber 68 of a combustor within the combustor section 43. The fuel is injected into the combustion chamber 68 by one or more fuel injectors and mixed with the compressed air to provide a fuel-air mixture. This fuel-air mixture is ignited and combustion products thereof flow through and sequentially cause the HPT rotor 55 and the LPT rotor 56 to rotate. The rotation of the HPT rotor 55 drives rotation of the compressor rotor 54 and, thus, compression of the air received from the airflow inlet 50. The rotation of the LPT rotor 56 and, more generally, the low speed rotating structure 64 provides mechanical power for driving (e.g., rotating) the propulsor rotor 28 of FIG. 1. The present disclosure, however, is not limited to such an exemplary gas turbine engine configuration. For example, in other embodiments, the low speed rotating structure 64 may also include a compressor rotor. In still other embodiments, the low speed rotating structure 64 may be omitted and the high speed rotating structure 60 may be configured for providing the mechanical power for driving the propulsor rotor 28 of FIG. 1.

Figure 3:
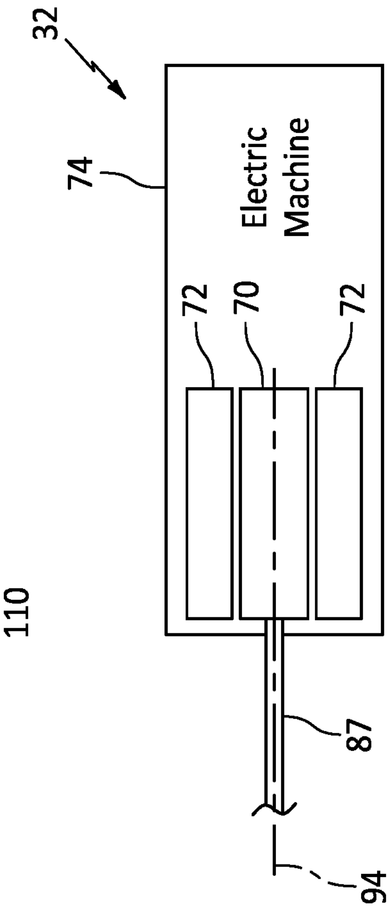
FIG. 3 is a schematic illustration of an electric machine.

Referring to FIG. 3, the electric machine 32 may be configurable as an electric motor and/or an electric generator. For example, during a motor mode of operation, the electric machine 32 may operate as the electric motor to convert electricity received from a power source (e.g., a battery bank) into mechanical power. This mechanical power may be utilized for various purposes within the aircraft propulsion system 26 of FIG. 1 such as, for example, rotating the propulsor rotor 28 and/or rotating a rotating structure within the thermal engine 30 (e.g., the low speed rotating structure 64 of FIG. 2) for various purposes. During a generator mode of operation, the electric machine 32 may operate as the electric generator to convert mechanical power received from, for example, the thermal engine 30 into electricity. This electricity may be utilized for various purposes within the aircraft propulsion system 26 such as, for example, electrically powering one or more electric components of the aircraft propulsion system 26 and/or charging the power source. The electricity may also or alternatively be utilized for various purposes outside of the aircraft propulsion system 26 such as, for example, electrically powering one or more electric components in the aircraft. Of course, in other embodiments, the electric machine 32 may alternatively be configured as (e.g., only) a dedicated electric motor.

The electric machine 32 of FIG. 3 includes an electric machine rotor 70 and an (e.g., annular) electric machine stator 72, where the electric machine stator 72 may be radially outboard of and circumscribe the electric machine rotor 70. The electric machine 32 also includes an electric machine case 74 that at least partially or completely houses the electric machine rotor 70 and the electric machine stator 72.

Referring to FIG. 1, the power transmission system 34 is configured to transmit mechanical power from the thermal engine 30 and/or the electric machine 32 to the propulsor rotor 28. The power transmission system 34 may also be configured to transmit mechanical power between the thermal engine 30 and the electric machine 32 during, for example, the generator mode of operation and/or various other modes of operation. The power transmission system 34 of FIG. 1 includes a geartrain 76 (e.g., a reduction gear system) for operatively coupling and transmitting mechanical power between two or more of the aircraft propulsion system components 28, 30 and/or 78. The power transmission system 34 of FIG. 1 also includes a drivetrain 78 for operatively coupling and transmitting mechanical power between the geartrain 76 and the electric machine 32.

The geartrain 76 of FIG. 1 includes a plurality of power transfer elements 80-82; e.g., shafts, gears, carriers, couplers, etc. The propulsor power transfer element 80 (e.g., a power output) is operatively coupled to and rotatable with the propulsor rotor 28 through the output shaft 37. The engine power transfer element 81 (e.g., a power input and/or a power output) is operatively coupled to and rotatable with the low speed rotating structure 64. The machine power transfer element 82 (e.g., a power input and/or a power output) is operatively coupled to and rotatable with the electric machine rotor 70 through the drivetrain 78. The power transfer elements 80-82 are arranged together within a geartrain case 84 such that mechanical power may be transmitted through the geartrain 76 and its power transfer elements 80-82, for example: (1) from the electric machine 32 to the propulsor rotor 28; (2) from the thermal engine 30 to the propulsor rotor 28; (3) from the thermal engine 30 to the electric machine 32; and/or (4) from the electric machine 32 to the thermal engine 30.

The drivetrain 78 of FIG. 1 includes a first driveshaft 86 and a second driveshaft 87. The drivetrain 78 may also include an angle drive 88 (e.g., bevel gearing, an angle gearbox, etc.) or another coupling (such as universal joints or CV joints) and/or transmission arranged between the first driveshaft 86 and the second driveshaft 87.

The first driveshaft 86 is rotatable about a first driveshaft rotational axis 90, which rotational axis 90 may be parallel with and/or (e.g., vertically) offset from the centerline 66. This first driveshaft 86 extends axially along its rotational axis 90 between (e.g., and to) the geartrain 76 and the angle drive 88. A first end of the first driveshaft 86 may be coupled to and rotatable with the machine power transfer element 82 (e.g., a shaft, a gear such as a bevel gear, a carrier, a coupler, etc.) of the geartrain 76. A second end of the first driveshaft 86 may be coupled to and rotatable with a power transfer element 92 of the angle drive 88.

Figure 4:
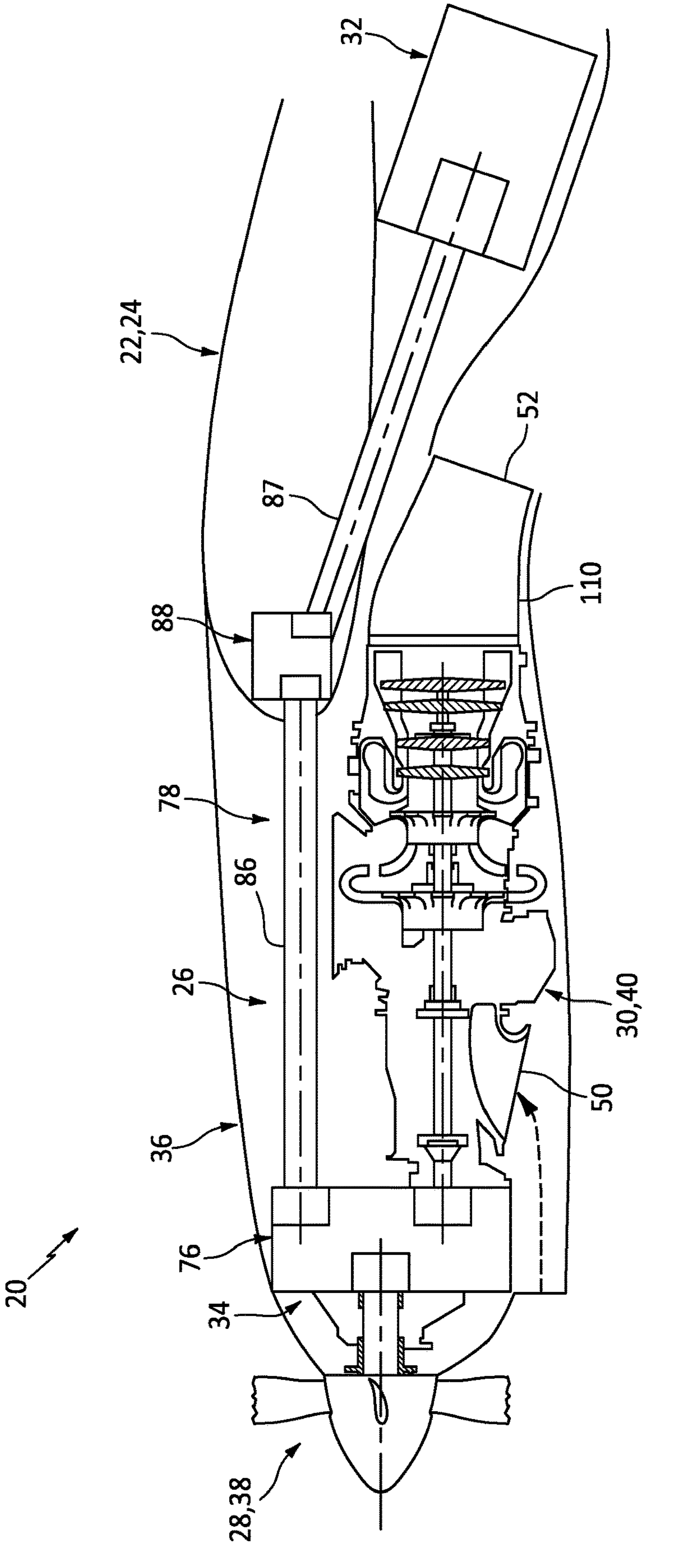
FIG. 4 is a partial sectional schematic illustration of the aircraft system with the electric machine disposed outside of and vertically below an aircraft wing.
Figure 5:
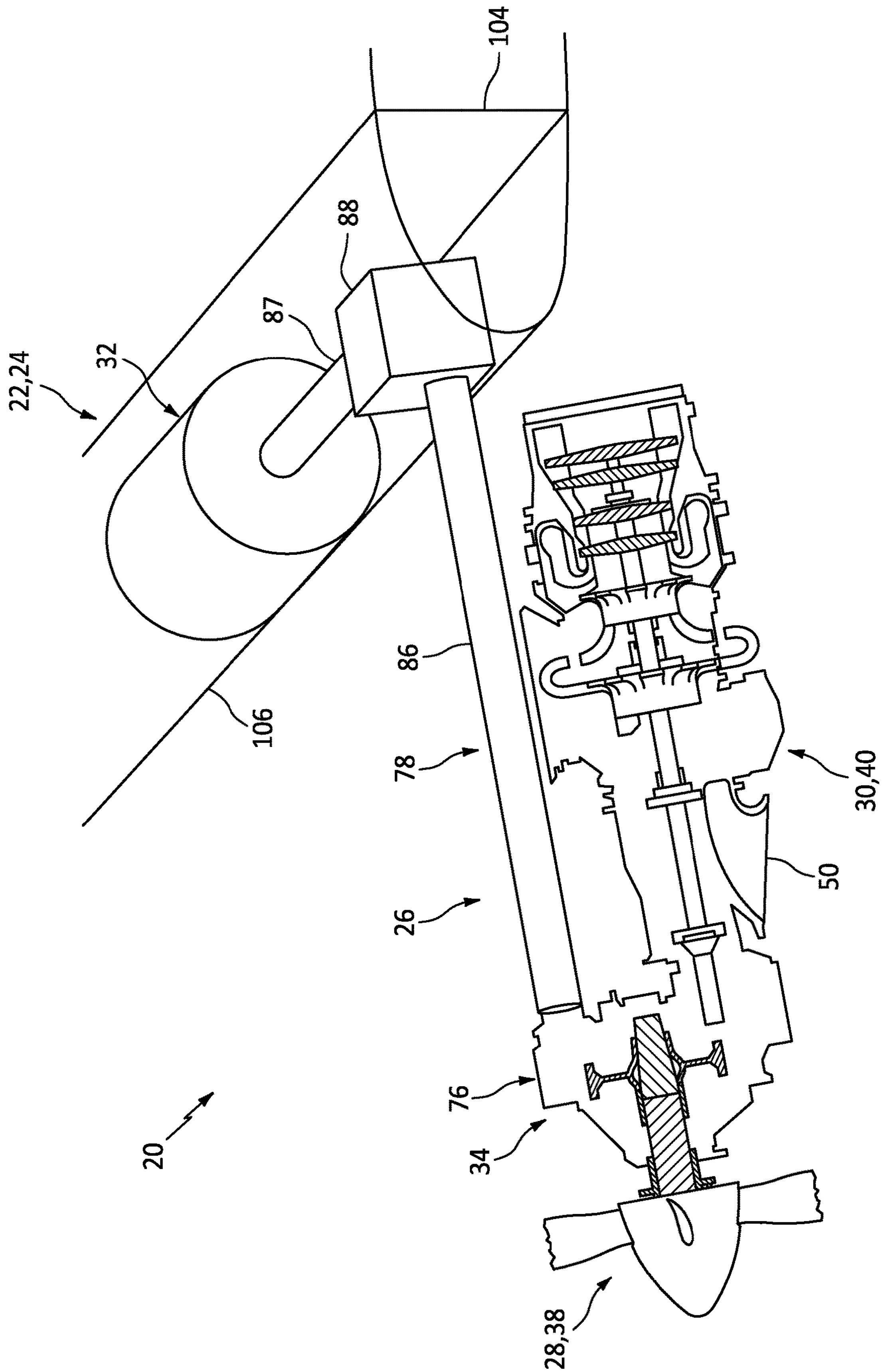
FIG. 5 is a partial perspective cutaway schematic illustration of the aircraft system with the electric machine housed within the aircraft wing at a leading edge of the aircraft wing.

The second driveshaft 87 is rotatable about a second driveshaft rotational axis 94, which rotational axis 94 is angularly offset from (e.g., non-parallel with) the first driveshaft rotational axis 90 (and the centerline 66) by an offset angle 96. The offset angle 96 may be a (e.g., non-zero) acute angle or a right angle. The offset angle 96, for example, may be between fifteen degrees (15°) and forty-five degrees (45°), between forty-five degrees (45°) and seventy-five degrees (75°), or between seventy-five degrees (75°) and ninety degrees (90°) depending on a location of the electric machine 32; see also FIGS. 4 and 5. The second driveshaft 87 extends axially along its rotational axis 94 between (e.g., and to) the electric machine 32 and its electric machine rotor 70 and the angle drive 88. A first end of the second driveshaft 87 may be coupled to and rotatable with the electric machine rotor 70. A second end of the second driveshaft 87 may be coupled to and rotatable with a power transfer element 98 (e.g., a shaft, a gear such as a bevel gear, a carrier, a coupler, etc.) of the angle drive 88.

With the foregoing arrangement, the first driveshaft 86 is coupled to, arranged between and operatively connects the geartrain 76 and the angle drive 88. The angle drive 88 is coupled to, arranged between and operatively connects the first driveshaft 86 and the second driveshaft 87. The second driveshaft 87 is coupled to, arranged between and operatively connects the angle drive 88 and the electric machine 32. Thus, the electric machine rotor 70 is rotatably coupled to the machine power transfer element 82 of the geartrain 76 sequentially through the drivetrain members 87, 88 and 86.

By including the drivetrain 78 and canting (e.g., angularly offsets) the second driveshaft 87 relative to the first driveshaft 86, the electric machine 32 may be remotely located from the geartrain 76 and/or the thermal engine 30. The electric machine 32 of FIG. 1, for example, is arranged downstream and/or aft of the thermal engine 30. The thermal engine 30 of FIG. 1, in particular, is disposed axially between (A) the propulsor rotor 28/the geartrain 76 and (B) the electric machine 32 relative to a rotational axis 100 of the propulsor rotor 28, which rotational axis 100 may be parallel with and/or vertically offset from the centerline 66 and/or the axis 90. The electric machine 32 may thereby be at least partially housed within the airframe structure 22 rather than (e.g., completely) within the nacelle 36 and adjacent (e.g., vertically and/or laterally next to) the thermal engine 30. Reducing the number of components housed within the nacelle 36 may reduce nacelle size, decrease nacelle drag and/or reduce nacelle blockage of thrust generated by the propulsor rotor 28. Furthermore, reducing the number of components housed within the nacelle 36 may reduce overhung weight of the aircraft propulsion system 26 cantilevered off of the airframe structure 22.

The thermal engine 30 and the electric machine 32 may be independently mounted to the airframe structure 22. The thermal engine 30, for example, may be mounted to the airframe structure 22 through a pylon structure 102 (schematically shown). The electric machine 32 may be mounted (e.g., directly) to one or more internal supports 104 (schematically shown) of the airframe structure 22. Thus, the electric machine 32 is not connected to the airframe structure 22 though the thermal engine 30, and the thermal engine 30 is not connected to the airframe structure 22 through the electric machine 32. However, it is contemplated that the thermal engine 30 and the electric machine 32 may be mounted to the airframe structure 22 through a common mounting structure (e.g., a pylon or otherwise) where, for example, the thermal engine 30 and the electric machine 32 are still independently supported; e.g., not connected to the airframe structure 30 through one another.

The aircraft propulsion system components 28, 30, 76 and 86 may be arranged outside of (e.g., external to) the airframe structure 22. The electric machine 32 (e.g., and the drivetrain members 87 and 88), however, may be at least partially (or completely) housed within the airframe structure 22. The drivetrain members 87 and 88 of FIG. 1, for example, are disposed (e.g., completely) within the airframe structure 22. The electric machine 32 is disposed partially within the airframe structure 22 and partially outside of (e.g., vertically below) the airframe structure 22. Here, the portion of the electric machine 32 below the airframe structure 22 may be housed within an aft portion of the nacelle 36. In other embodiments, referring to FIG. 4, the electric machine 32 may be disposed outside of the airframe structure 22. The electric machine 32 of FIG. 4, for example, is disposed vertically below the airframe structure 22 and (e.g., completely) housed within the aft portion of the nacelle 36, or another housing. In still other embodiments, referring to FIG. 5, the electric machine 32 may be disposed (e.g., completely) within the airframe structure 22. The electric machine 32 of FIG. 5, in particular, is disposed at and extends along a leading edge 106 of the airframe structure 22; e.g., the aircraft wing 24. In such embodiments, the electric machine 32 is disposed to a lateral side of the thermal engine 30. By contrast, in the embodiments of FIGS. 1 and 4, the electric machine 32 may (or may not) be laterally aligned with and/or laterally overlap the thermal engine 30.

In some embodiments, referring to FIG. 1, the combustion products output from the thermal engine 30 may be exhausted from the aircraft propulsion system 26 into an exterior environment 108 through an exhaust duct 110, which exhaust duct 110 may form the combustion products exhaust 52. This exhaust duct 110 may be arranged at an aft and/or downstream end of the thermal engine 30. At least a (e.g., forward and/or upstream) portion of the electric machine 32 may longitudinally overlap the exhaust duct 110. At least a (e.g., aft and/or downstream) portion of the electric machine 32 may be disposed aft and/or downstream of the exhaust duct 110. In other embodiments however, referring to FIG. 4, an entirety of the electric machine 32 may be disposed aft and/or downstream of the exhaust duct 110.

The airframe structure 22 is described above as the aircraft wing 24 for ease of description. It is contemplated, however, the airframe structure 22 may alternatively be configured as part of an aircraft fuselage where, for example, the aircraft propulsion system 26 is mounted to the aircraft fuselage and/or the aircraft is configured as a helicopter.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An aircraft system, comprising:

a propulsor rotor;

a geartrain including a power output, a first power input and a second power input, the power output coupled to the propulsor rotor, the propulsor rotor is rotatable about a rotational axis;

a thermal engine configured to drive rotation of the propulsor rotor through the geartrain, the thermal engine including an exhaust duct at an aft end of the thermal engine, and the thermal engine coupled to the first power input;

a drivetrain including a first driveshaft and a second driveshaft, the first driveshaft coupled to and extending axially between the second power input and the second driveshaft, the second driveshaft angularly offset from the first driveshaft, and the first driveshaft extending axially along and radially outboard of the thermal engine; and an electric machine configured to drive rotation of the propulsor rotor through the drivetrain and the geartrain, the second driveshaft coupled to and between the first driveshaft and the electric machine;

wherein the thermal engine is located axially between the geartrain and the electric machine along the rotational axis; and wherein at least a portion of the electric machine is disposed aft of the exhaust duct.

2. The aircraft system of claim 1, wherein the second driveshaft is angularly offset from the first driveshaft by an acute angle.

3. The aircraft system of claim 1, wherein the second driveshaft is angularly offset from the first driveshaft by a right angle.

4. The aircraft system of claim 1, wherein the drivetrain further includes an angle drive coupled to and between the first driveshaft and the second driveshaft.

5. The aircraft system of claim 1, further comprising:

an airframe structure;

the thermal engine and the electric machine independently mounted to the airframe structure.

6. The aircraft system of claim 5, wherein the airframe structure is configured as an aircraft wing.

7. The aircraft system of claim 6, wherein the electric machine is housed within the aircraft wing at a leading edge of the aircraft wing.

8. The aircraft system of claim 5, wherein the thermal engine is disposed outside of the airframe structure; and the electric machine is at least partially housed within the airframe structure.

9. The aircraft system of claim 5, wherein the electric machine is vertically below the airframe structure.

10. The aircraft system of claim 5, wherein the electric machine is outside of the airframe structure.

11. The aircraft system of claim 5, further comprising a nacelle at least partially housing the thermal engine and the electric machine.

12. The aircraft system of claim 1, wherein the electric machine is configurable as an electric motor during a motor mode of operation to drive rotation of the propulsor rotor through the drivetrain and the geartrain; and the electric machine is further configurable as an electric generator during a generator mode of operation where the thermal engine is configured to power the electric machine through the geartrain and the drivetrain.

13. The aircraft system of claim 1, wherein the thermal engine is configured as a gas turbine engine.

14. The aircraft system of claim 1, wherein the propulsor rotor comprises a propeller rotor.

15. An aircraft system, comprising:

a propulsor rotor;

a thermal engine configured to drive rotation of the propulsor rotor through a first power input, the thermal engine including an exhaust duct at an aft end of the thermal engine;

an electric machine configured to drive rotation of the propulsor rotor through a second power input;

an aircraft wing, the thermal engine and the electric machine independently mounted to the aircraft wing, the thermal engine disposed outside of the aircraft wing, and the electric machine at least partially housed within the aircraft wing; and a geartrain including a power output, the first power input and the second power input, the power output coupled to the propulsor rotor, and the first power input coupled to the thermal engine;

wherein the exhaust duct is axially between the thermal engine and at least a portion of the electric machine, and the exhaust duct is angularly offset from a rotational axis of the thermal engine.

16. The aircraft system of claim 15, further comprising a drivetrain including a first driveshaft, a second driveshaft and an angle drive coupling the first driveshaft to the second driveshaft, the first driveshaft coupled to the second power input, the second driveshaft coupled to the electric machine.

17. An aircraft system, comprising:

a propulsor rotor;

a geartrain including a power output, a first power input and a second power input, the power output coupled to the propulsor rotor, the propulsor rotor is rotatable about a rotational axis;

a thermal engine configured to drive rotation of the propulsor rotor through the geartrain, the thermal engine coupled to the first power input;

a drivetrain including a first driveshaft and a second driveshaft, the first driveshaft coupled to and between the second power input and the second driveshaft, the first driveshaft extending axially along and radially outboard of the thermal engine, and the second driveshaft angularly offset from the first driveshaft;

an electric machine configured to drive rotation of the propulsor rotor; and an aircraft wing, the thermal engine disposed outside of the aircraft wing, and the electric machine at least partially housed within the aircraft wing.

18. The aircraft system of claim 1, further comprising:

a nacelle housing the geartrain and the thermal engine;

wherein the electric machine is disposed outside of the nacelle.

19. The aircraft system of claim 1, further comprising:

an airframe structure;

the electric machine is at least partially housed within the airframe structure; and the thermal engine is cantilevered from the airframe structure.

20. The aircraft system of claim 1, wherein the exhaust duct is angularly offset from the rotational axis.

* * * * *